United States Patent
Luo et al.

(10) Patent No.: US 10,397,258 B2
(45) Date of Patent: Aug. 27, 2019

(54) CONTINUOUS LEARNING FOR INTRUSION DETECTION

(71) Applicant: Microsoft Technology Licensing, LLC, Redmond, WA (US)

(72) Inventors: Pengcheng Luo, Cambridge, MA (US); Reeves Hoppe Briggs, Boxborough, MA (US); Naveed Ahmad, Medford, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 246 days.

(21) Appl. No.: 15/419,933

(22) Filed: Jan. 30, 2017

(65) Prior Publication Data

US 2018/0219887 A1   Aug. 2, 2018

(51) Int. Cl.
*G06F 8/77*      (2018.01)
*G06F 21/00*    (2013.01)
*G06F 21/50*    (2013.01)
*G06F 21/55*    (2013.01)
*G06F 21/56*    (2013.01)
(Continued)

(52) U.S. Cl.
CPC .......... *H04L 63/1425* (2013.01); *G06F 21/55* (2013.01); *G06N 7/005* (2013.01); *H04L 63/14* (2013.01)

(58) Field of Classification Search
CPC ......... H04L 43/04; H04L 43/08; H04L 51/12; H04L 63/14; H04L 63/20; H04L 67/42; G06F 8/77; G06F 21/00; G06F 21/50; G06F 21/55; G06F 21/56
See application file for complete search history.

(56) References Cited

U.S. PATENT DOCUMENTS 7,072,876 B1 *  7/2006  Michael ............... G06F 21/552
                                                      706/12
7,225,343 B1    5/2007  Honig et al.
(Continued)

OTHER PUBLICATIONS

"International Search Report and Written Opinion Issued in PCT Application No. PCT/US18/014606", dated Apr. 24, 2018, 12 Pages.

(Continued)

*Primary Examiner* — Joseph P Hirl
*Assistant Examiner* — Kalish K Bell
(74) *Attorney, Agent, or Firm* — Merchant & Gould (57) ABSTRACT

Balancing the observed signals used to train network intrusion detection models allows for a more accurate allocation of computing resources to defend the network from malicious parties. The models are trained against live data defined within a rolling window and historic data to detect user-defined features in the data. Automated attacks ensure that various kinds of attacks are always present in the rolling training window. The set of models are constantly trained to determine which model to place into production, to alert analysts of intrusions, and/or to automatically deploy countermeasures. The models are continually updated as the features are redefined and as the data in the rolling window changes, and the content of the rolling window is balanced to provide sufficient data of each observed type by which to train the models. When balancing the dataset, low-population signals are overlaid onto high-population signals to balance their relative numbers.

20 Claims, 5 Drawing Sheets

(51) Int. Cl.
  *H04L 29/06* (2006.01)
  *G06N 7/00* (2006.01)

(56) References Cited

U.S. PATENT DOCUMENTS

| | | |
|---|---|---|
| 7,454,792 B2 | 11/2008 | Cantrell et al. |
| 7,690,037 B1 | 3/2010 | Hartmann |
| 8,635,171 B1 | 1/2014 | Kennedy |
| 8,762,298 B1 | 6/2014 | Ranjan et al. |
| 9,043,894 B1 | 5/2015 | Dennison et al. |
| 9,306,962 B1 * | 4/2016 | Pinto .................. H04L 63/1416 |
| 9,485,263 B2 | 11/2016 | Sol et al. |
| 2003/0188189 A1 | 10/2003 | Desai et al. |
| 2006/0015943 A1 | 1/2006 | Mahieu |
| 2006/0095968 A1 | 5/2006 | Portolani et al. |
| 2009/0099988 A1 | 4/2009 | Stokes et al. |
| 2010/0064369 A1 * | 3/2010 | Stolfo ..................... G06F 21/56 |
| | | 726/24 |
| 2011/0004935 A1 | 1/2011 | Moffie et al. |
| 2012/0158626 A1 * | 6/2012 | Zhu ........................ G06F 21/56 |
| | | 706/13 |
| 2015/0067857 A1 * | 3/2015 | Symons ................. G06N 5/043 |
| | | 726/23 |
| 2016/0088000 A1 | 3/2016 | Siva kumar et al. |
| 2016/0337387 A1 | 11/2016 | Hu et al. |
| 2017/0026391 A1 | 1/2017 | Abu-nimeh |

OTHER PUBLICATIONS

Lee, et al., "Real Time Data Mining-based Intrusion Detection", In Proceedings of IEEE DARPA Information Survivability Conference & Exposition II, vol. 1, Jun. 12, 2001, 12 pages.

\* cited by examiner

CONTINUOUS LEARNING FOR INTRUSION DETECTION

BACKGROUND

Computer networks are under constant threat from malicious parties seeking unauthorized access to the systems hosted thereon. The tactics used by malicious parties to attack networks and the tactics used by network administrators to defend against attacks are constantly evolving in light of one another; new exploits are added to the arsenal of malicious parties and ineffective exploits are dropped. Implementing countermeasures, however, is often reactive, wherein network administrators must wait to identify the newest exploit before deploying a countermeasure and determining when to stop deploying a countermeasure when the corresponding exploit is no longer used. Correctly identifying and blocking the latest exploits is often challenging for network administrators, especially when an exploit is not yet widespread or attacks a small population of services offered on the network.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer storage devices including instructions are provided herein to provide continuous learning for intrusion detection. Multiple machine learning models are constantly retrained on the network signals based on signals gathered from the machines and devices within the network representing attacks and benign behavior. A rolling window is used to gather the signals, so that the models use the most up-to-date data to identify attacks, and the models are continually promoted and demoted to guard the network as their abilities to accurately detect attacks wax and wane in response to the composition of the most recent data. Models deployed in active production networks provide their detections in near real-time to security analysts, who provide feedback on the accuracy of the models (e.g., missed intrusions/false negatives, false positives, miss-identified intrusions) to further refine how the models are trained.

To improve the reliability of the training dataset used to constantly retrain and refine the detection models, and thereby improve the models, the attack signals are balanced to address their scarcity compared to benign signal and in regard to particular attack types. Benign signals are overlaid with attack signals of various types from other machines to provide a balanced training set for training and refining the models. Among the attack signals in the balanced training set, the signals of various attack types are also balanced to ensure that model is equally trained on all attack types. Features of the signals are dynamically extracted via text-based configuration, thus improving the flexibility of the models to respond to different feature sets indicative of an attack on the network.

In various aspects, attacks are simulated by a known internal attacker to increase the readiness of the network and generate additional attack signals. Similarly, historically significant attack signals are used in some aspects so that even if attack signals of a particular type have not been observed in the rolling window, those signals are presented to the models.

By providing continuously learning intrusion detection models for a network, the functionalities of the devices and software in the network are improved. New forms of attacks are identified faster and more reliably, thus addressing the computer-centric problem of how to improve the security of the network. Additionally, computing resources are not wasted in attempting to detect deprecated attack forms, thus reducing the processing resources used to safeguard the network from malicious parties.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable storage devices including instructions for providing improved network security via continuously learning intrusion detection models are discussed herein. By providing continuously learning intrusion detection models for a network, the functionalities of the devices and software in the network are improved. New forms of attacks are identified faster and more reliably, thus addressing the computer-centric problem of how to improve the security of the network. Additionally, computing resources are not wasted in attempting to detect deprecated attack forms, thus reducing the processing resources used to safeguard the network from malicious parties.

Figure 1A:
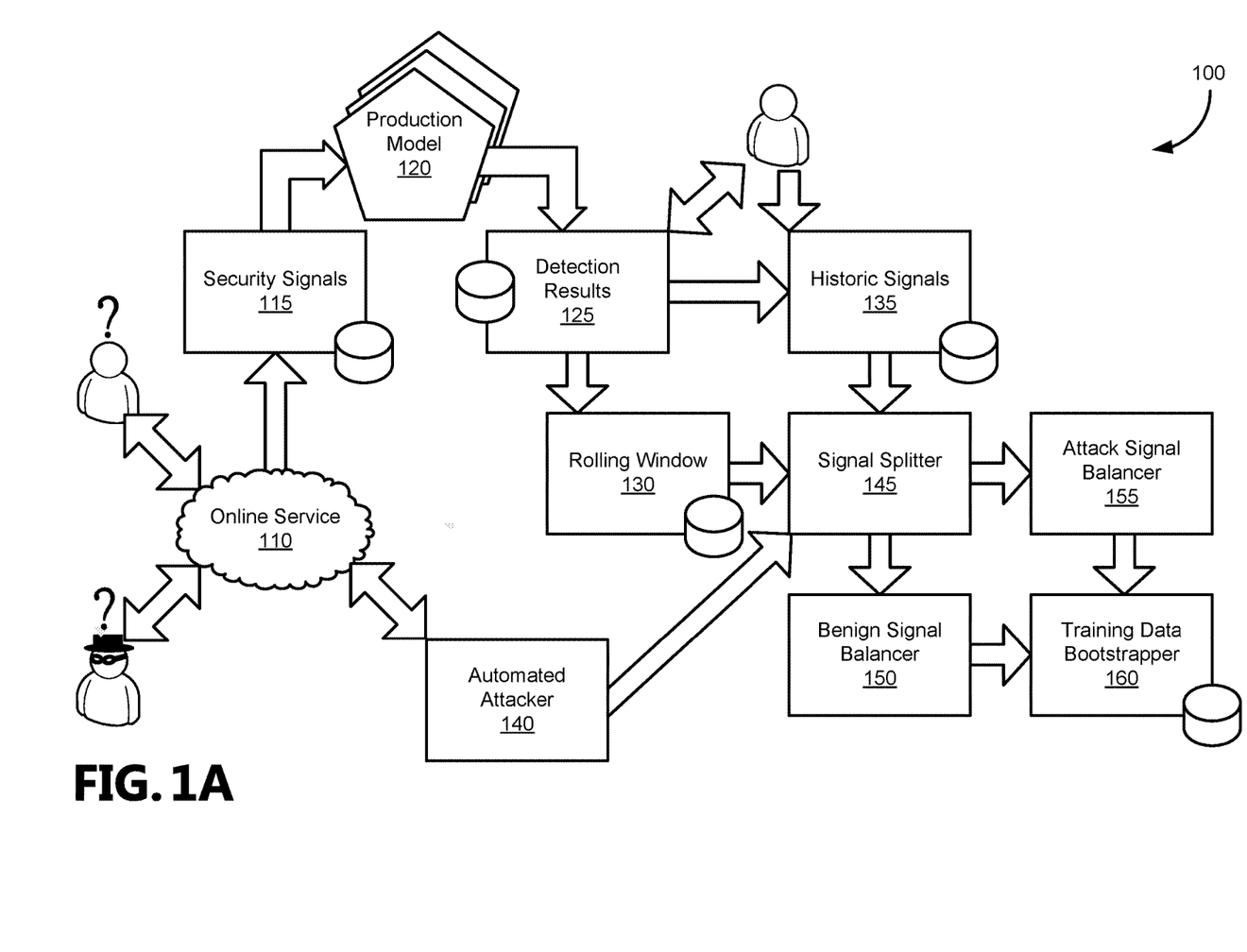
FIG. 1A is an example security system with which the present disclosure may be practiced.

FIG. 1A is an example security system 100 with which the present disclosure may be practiced. As shown in FIG. 1A, an online service 110 is connected to by various users—who may be benign or malicious—and the security system 100. The online service 110 represents a networked set of computing devices, such as a cloud data center, that provides "cloud" services to various users, including, but not limited to: Infrastructure as a Service (IaaS), where the user provides the operating system and software running on the devices of the online service 110; Platform as a Service (PaaS), where the user provides the software and the online service 110 provides the operating system and devices; or Software as a Service (SaaS), where the online service 110 provides both the operating system and software to run on the devices for the users. The users who seek to access the online service 110 may be legitimate users or malicious parties, who exploit security vulnerabilities to intrude upon the online service 110 to run unauthorized processes and/or retrieve data from the online service 110 without legitimate authorization.

To determine whether the users are benign or malicious or whether the devices are secure (not sending malicious signals) or compromised (sending malicious signals), various security signals 115 from the online service 110 are gathered and fed into production models 120 to produce detection results 125 indicating whether a given session is malicious or benign. The security signals 115 include event logs, network traces, system commands, and the like, which are analyzed by the production models 120 for characteristics and their feature values determined via training of the production models 120 to be indicative of malicious or benign behavior. For the purpose of the present disclosure, particular security signals 115 are referred to as being "maliious" or "benign" based on the actions in the online service 110 associated with generating the particular security signals 115. Also, as used herein, the term "feature" is a numeric attribute derived from one or more input signals related to a characteristic or behavior observed in the network which are accepted by a "model", which is an algorithm that accepts a feature set (also referred to as model features) defined by an analyst to convert the values of the features into a predictive score or confidence of whether the features indicate malicious or benign activity.

The security signals 115 are provided to the production models 120 to extract various features from the security signals 115 for which the production models 120 have been trained to identify malicious activities on the online service 110. A security signal 115 is a collection of one or more related events occurring on devices within the online service 110, and may include several features (e.g., port used, IP address connected to, device identity/type from which the signal is received, user, action taken) of which a subset are extracted for examination by a given production model 120 to determine whether the security signal 115 is benign or malicious. The features from one or more security signals 115 are combined into a feature vector for analysis, and in various aspects, features may be scored to provide a numerical analysis of that feature for input to the production models 120.

For example, a given IP (Internet Protocol) address may be scored based on its frequency of use, where more frequent use of the given IP address during the rolling window 130 will change the value presented to the production model 120 compared to less frequent use. Contrarily, if a sensitive file is accessed, forbidden action is taken, a blacklisted IP address is communicated with, etc., a binary score indicating that the dangerous condition occurred may be provided to the production model 120 in the security signal 115. The production models 120 do not rely on whitelists or blacklists, and their training is relative to the features observed in the security signals 115 is discussed in greater details in regard to FIGS. 1B, 2, and 3, which may learn over time without the direction of a blacklist or whitelist the features that are indicative of an intrusion to the online service 110.

For a given security signal 115, the determination by the production models 120 specifies whether the security signal 115 in question is benign or malicious. These detection results 125 are associated with the security signals 115 to identify them as either malicious or benign. In some aspects, at least some of these detection results 125 (e.g., the malicious detection results 125) are provided to an analyst user, who may act on the detection results 125 to deploy countermeasures against a malicious user or attack, or determine that the detection results 125 warrant a different assessment than the production models 120 indicate. For example, when a false negative for a malicious signal was indicated by the production model 120, the analyst may assess that the signal is in fact malicious and indicate an action that should be taken. In another example, when a false positive for a benign signal was indicated, the analyst may assess that the signal is in fact benign and indicate that no action should be taken. In a further example, when a true positive for a malicious action was indicated, the analyst may indicate that no action or a different action than recommended by the security system 100 is to be taken). Corrections from analysts there thereby used in further training and improvement of the models.

The detection results 125 are also fed, in various aspects, to a database storing a rolling window 130 of the observed security signals 115 for the past d days (where d is configurable by the analyst user or another network administrator, e.g., as two, ten, fifteen, etc. days), and a database storing historic signals 135 for security signals 115 that should be used for training regardless of whether they have been seen in the past d days. The historic signals 135 are curated by the analyst user to include security signals 115 associated with known external attacks. In additional aspects, an analyst user curates the historic signals 135 to include benign signals that may look suspicious or otherwise return false positives for network intrusion to ensure that the predictive models are trained to properly respond to signals that have historically proven difficult to properly identify.

The automated attacker 140 uses known patterns of attacks and exploits to test the security of the online service 110 and provide known results for use in conjunction with the detection results 125 produced by the production models 120. When the detection results 125 for a security signal 115 that is the result of an attack from the automated attacker 140 does not specify that the attack was malicious, the security signal 115 will be treated as malicious, as the automated attacker 140 indicates that it was malicious. In various aspects, the automated attacker 140 is an optional component of the security system 100 or the online service 110.

The security signals 115 (including those in the rolling window 130 and the historic signals 135, when available)

are fed to a signal splitter 145 along with the detection results 125 from the production models 120 (and corrections from the analyst user) indicating whether a security signal 115 was determined to be benign or malicious. Similarly, in aspects in which an automated attacker 140 is deployed, the benign/malicious identity of the security signals 115 generated from its actions on the online service 110 are provided to the signal splitter 145. The signal splitter 145 is configured to divide the security signals 115 into benign signals, provided to a benign signal balancer 150, and malicious signals, provided to an attack signal balancer 155.

The benign signal balancer 150 and the attack signal balancer 155 develop the set of security signals 115 used to populate the dataset used by the training data bootstrapper 160 to provide balanced benign and malicious signals by which to train the models to detect up-to-date exploits of the online service 110. The training data bootstrapper 160 removes benign signals received from compromised devices in the online service 110, leaving behind only the malicious signals from the compromised devices. The benign signals from clean devices are cross joined with the malicious signals from compromised devices, resulting in B×M attack examples, where B represents the number of benign examples and M the number of malicious examples. This produces an expanded dataset that overlays attack examples onto benign examples as though the attacks took place on clean devices.

As clean devices have different variations of benign signals, and compromised devices have different variations of attack signals, cross joining the two datasets creates a large number of scenarios with a great deal of variation. However, if the scenarios are chosen randomly, such as by an automated attacker 140, an unequal number of each attack type may be present in the training set, which could skew the training of the models (resulting in some attacks being better predicted than others). The attack examples are therefore balanced against the attack scenarios to ensure that there is a substantially equal number (e.g., ±5%) of each example attack the training set. In various aspects, underrepresented attack types (i.e., attack types of a quantity below a balanced number) have existing malicious signals copied to increase their relative number and/or overrepresented attack types (i.e., attack types of a quantity above a balanced number) have existing malicious signals deleted or replaced/overlaid by examples of underrepresented attack types to reach a balanced attack example set.

Similarly to the malicious signals, benign signals are balanced relative to one another in regard to the device type or role from which the signals were received, such that a given device type or role is not over represented in the training dataset (resulting in some attacks being better predicted on given device types/roles than others). The benign examples are therefore balanced against the available device type to ensure that there is a substantially equal (e.g., ±5%) number of each device type providing benign examples. In various aspects, underrepresented device types (i.e., device types of a quantity below a balanced number) have existing benign signals copied to increase their relative number and/or overrepresented device types (i.e., device types of a quantity above a balanced number) have existing benign signals deleted or replaced/overlaid by benign examples from underrepresented device types to reach a balanced benign example set.

Figure 1B:
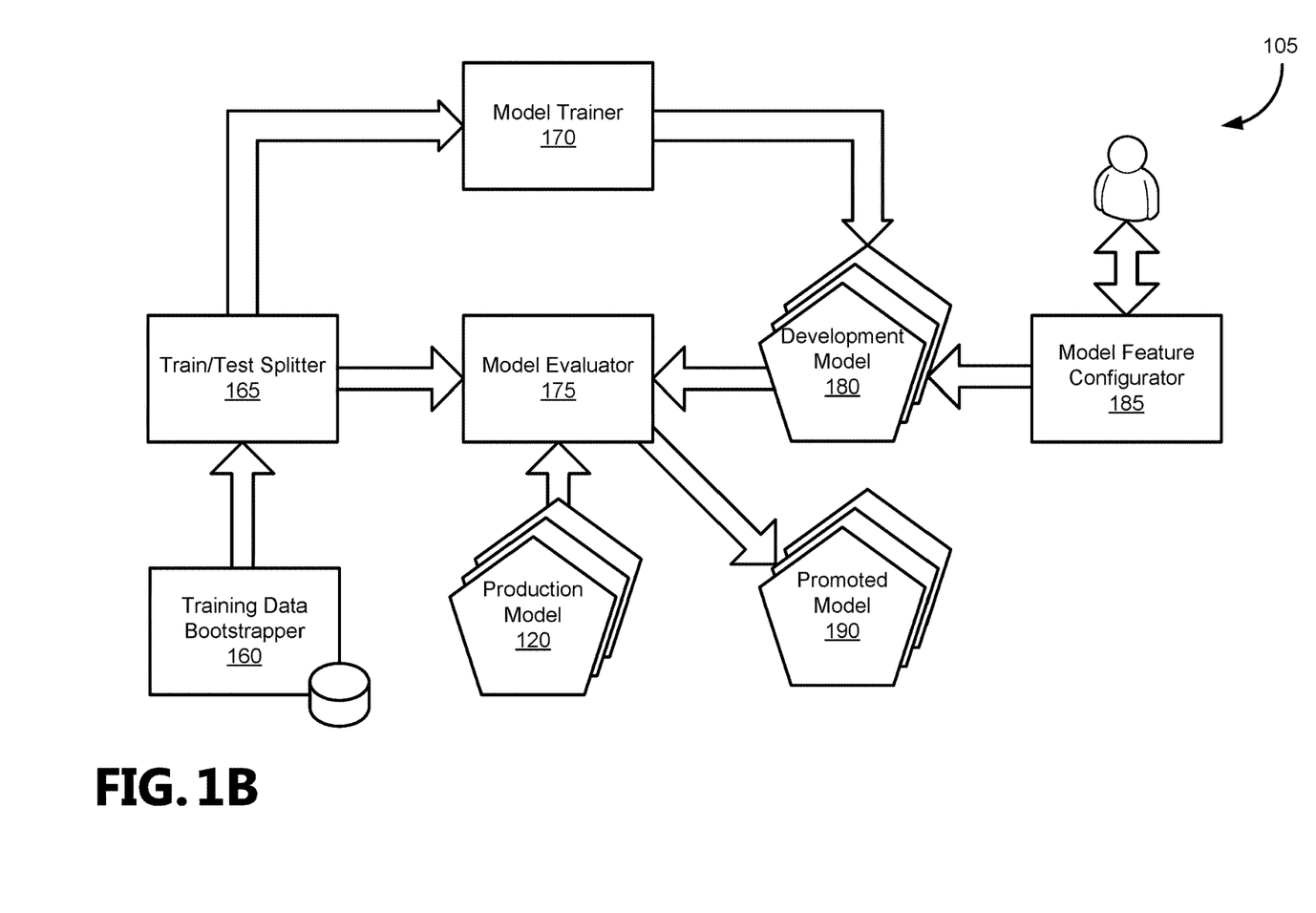
FIG. 1B is an example model training and selection system for use with the example security system of FIG. 1A with which the present disclosure may be practiced.

FIG. 1B is an example model training and selection system 105 for use with the example security system 100 of FIG. 1A with which the present disclosure may be practiced. The balanced dataset of benign and malicious signals from the training data bootstrapper 160 is provided to a train/test splitter 165 to both train and evaluate various models by which to secure the online service 110. The data set is divided into k subsets, where k−1 of the available subsets (e.g., two thirds) are used to train the models, and one subset of the dataset (e.g., one-third) is reserved to evaluate the models. In various aspects, different fractions are envisioned for splitting the dataset into training and evaluation subsets, which are provided to a model trainer 170 and a model evaluator 175 respectively.

The model trainer 170 is configured to train a plurality of development models 180 via one or more machine learning techniques via the training subset of the balanced data. Machine learning techniques train models to accurately make predictions on data fed into the models (e.g., whether the security signals 115 are benign or malicious; whether a noun is a person, place, or thing; what the weather will be like tomorrow). During a learning phase, the models are developed against a training dataset of known inputs (e.g., sample A, sample B, sample C) to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs, so that the model may develop its own rules to discover relationships within the training dataset. In a semi-supervised learning phase, an incompletely labeled training set is provided, with some of the outputs known and some unknown for the training dataset.

Models may be run against a training dataset for several epochs, in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs in how consistently it places a given input into a given group and how reliably it produces the n desired clusters across each epoch.

In various aspects, cross validation is applied on top of each training phase, where a portion of the training dataset is used as an evaluation dataset. For example, the training dataset may be split into k segments, where (k−1) segments are used in training epochs, and the remaining segment is used to determine how well the trained models performed. In this way, each model is trained against every available combination of input parameters, so that each model is trained k times, and the best model parameters are selected based on their average performances across the epochs.

Once an epoch is run, the models are evaluated and the values of their variables are adjusted to attempt to better refine the model. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/ mutation to provide additional data points. One of ordinary skill in the art will be familiar with several other machine learning algorithms that may be applied with the present disclosure, including linear regression, random forests, decision tree learning, neural networks, etc.

The model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and if such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. Models that are finalized are evaluated against testing criteria. In a first example, a testing dataset that includes known outputs for its inputs is fed into the finalized models to determine an accuracy of the models in handling data that they have not been trained on. In a second example, a false positive rate, false negative rate may be used to evaluate the models after finalization. In a third example, delineation between clusterings is used to select a model that produces the clearest bounds for its clusters of data. In other examples, additional metrics of the models are evaluated, such as areas under precision and recall curves.

The development models 180 (and therefore the production models 120) are predictive models that are initially developed by a model feature configurator 185 based on selections made by an administrative user. The administrative user selects one or more features of a security signal 115 that are to be listened for on the devices of the online service 110 and how those features are to be analyzed to signify whether a given security signal 115 is malicious or benign. In various aspects, the features are provided in a structured text files (e.g., using Extensible Markup Language (XML) or JavaScript Object Notation (JSON) tags) that the administrative user is able to select from to define a feature set for a new development model 180. Based on the features configuration, features are dynamically extracted as feature vector from the given set of security signals for a device. Different features may be extracted for different models based on their respective features configuration. The structured text files, hence, allow the administrative user to add or modify features and how they are examined to a model without having to add or modify code to a codebase; the structured text file invokes code segments from a codebase that may be expanded or modified by a developer to deliver new feature types for the administrative user to select from. For example, an administrative user may select as a feature examination type for use with a given parameter or data field from the security signals 115: a count of distinct values in a dataset (Count), a maximum value in a data set (Max), a count of the most frequently occurring value in a list (MaxCount), a maximum sum of values in a list that does not exceed a limit (MaxSum), etc. Examples of data fields/ parameters to observe in the security signals include, but are not limited to: signal types (e.g., data exfiltration, logon attempts, access requests to given files), ports used, bytes used in a process/communication, bytes transferred to/from a given Internet Protocol (IP) address and port tuple, a user identifier, whether a given IP address or action is on a blacklist or whitelist, etc.

The model evaluator 175 is configured to evaluate the development models 180 to determine which models are to be used as production models 120 in the security system 100. In various aspects, the production models 120 are reincorporated into the development models 180 for evaluation, or the accuracy thresholds of the production models 120 are used for determining whether to replace a given production model 120 with a development model 180. In other aspects, development models 180 are compared with the production models 120 in regard to other metrics, such as, for example, accuracy, areas under precision and recall curves, etc., in which the best models are selected as promoted models 190 for use as production models 120. Models may be continually promoted from development models 180 to production models 120 (and demoted from production models 120 to development models 180) as the model evaluator 175 determines that their effectiveness in properly identifying malicious signals as malicious and benign signals as benign. In various aspects, the top n most accurate development models 180 or all development models 180 exceeding an accuracy threshold are promoted as promoted models 190 to production models 120. In other aspects, an administrative user may manually promote a development model 180 to a production model 120, such as, for example, when no other model monitors a given feature of the security signals 115.

The security system 100, the model training and selection system 105, and their respective component elements are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIG. 4.

While the component elements of the security system 100 and the model training and selection system 105 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component elements illustrated in FIGS. 1A and 1B to route the communications between those systems, which are not illustrated so as not to distract from the novel aspects of the present disclosure.

Figure 2:
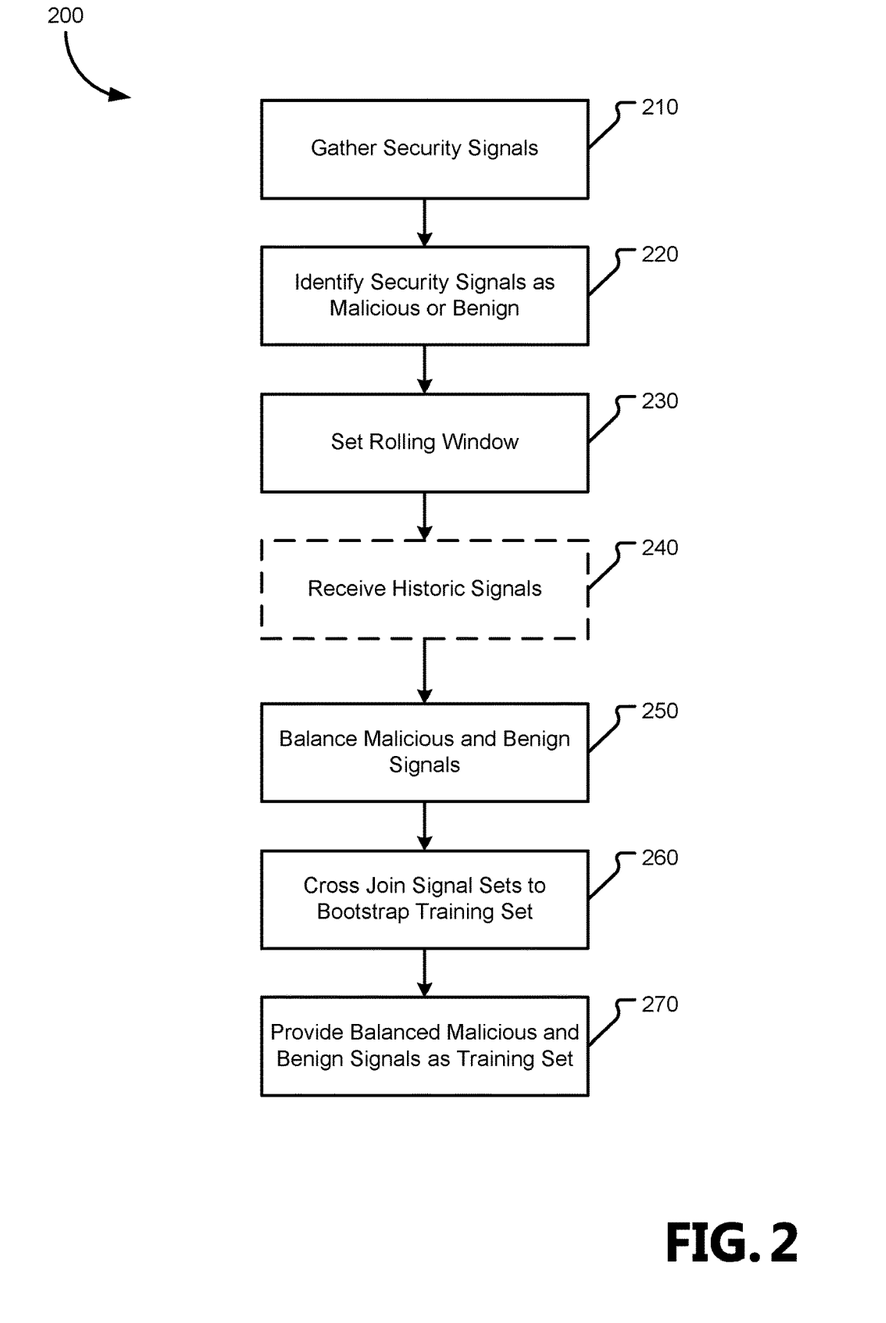
FIG. 2 is a flow chart showing general stages involved in an example method for developing a training dataset by which to train predictive models for use in securing an online service.

FIG. 2 is a flow chart showing general stages involved in an example method 200 for developing a training dataset by which to train predictive models for use in securing an online service 110. Method 200 begins with OPERATION 210, where security signals 115 are gathered. In various aspects, security signals 115 may be received in real-time (or near real-time, accounting for processing and transmission delays) or may be received and cached in a database for periodic review, such as, for example, in a batch process to review security events every m minutes. The security signals 115 include listened-for events and parameters of various actions taking place on machines in the online service 110.

The listened-for events and parameters are used at OPERATION 220 to identify whether a given security signal 115 corresponds to an action that is malicious or benign. In various aspects, the gathered security signals 115 are fed to predictive models designated for use with live online services 110 (i.e., the production models 120) to determine whether each security signal 115 is malicious or benign. These determinations are presented to analyst users, who may act upon the determinations to secure the online service 110 against a malicious party, but may also countermand the determination made by the predictive models; indicating that the determination is a false positive or a false negative. Similarly, in aspects where an automated attacker 140 is used to simulate an attack on the online service 110, the automated attacker 140 provides a notification that identifies the security signals 115 produced in response to the attack as malicious so that those security signals 115 are treated as malicious regardless of the detection result from the predictive models.

At OPERATION 230 a rolling window 130 is set to define a timeframe from the current time in which to analyze security signals 115 relevant to the most-current exploits and attacks being executed on the online service 110. The rolling window 130 defines a set of security signals 115 falling within a designated period of time from the current time; the security signals 115 gathered within the last d days. A window of multiple days is used for training and predicting slow attacks, which are carried out over multiple days to avoid detection by conventional security systems. As security signals 115 are gathered, the most recent security signals are added to the set of security signals 115 for the rolling window 130 and the security signals 115 that were gathered prior to the designated period of time for the rolling window 130 are continually removed from the set of security signals 115.

In some aspects, historic signals 135 are optionally received at OPERATION 240. The historic signals 135 are curated by an analyst user from previously observed security signals 115 to include historically significant security signals 115 that represent certain attack types or benign use cases that are designated for training purposes regardless of whether a similar attack or use case has been seen within the time period of the rolling window 130. In one example, a historically dangerous exploit may have security signals 115 related to its detection added to the historic signals 135 to constantly remain on guard against that exploit. In another example, a developer may discover a zero-day exploit and not know whether malicious parties are using it yet, and provide an example security signal 115 mimicking the actions of the zero-day exploit for use as a historic signal 135 to preemptively guard against the exploit, even if it is never seen. In yet a further example, a security signal 115 that frequently results in false positives may be added to the historic signals 135 to ensure the predictive models are trained against that particular security signal 115. The historic signals 135, if available, are added to the set of security signals 115 gathered within the rolling window 130.

Proceeding to OPERATION 250, method 200 balances the malicious and benign signals gathered that fall within the rolling window 130 and any historic signals 135 added to the set at optional OPERATION 240. When balancing malicious signals, the attack type of each signal is determined so that the relative quantities of the signals representing each attack type are brought into equilibrium (i.e., equalized), so that no given attack type is overrepresented or underrepresented in the population of malicious signals. When balancing benign signals, benign signals received from devices that have produced malicious signals within the rolling window 130 are discarded, and the relative quantities of the benign signals received from each type of device in the online service 110 are brought into equilibrium, so that no given device type is overrepresented or underrepresented in the population of benign signals.

Additionally, as the set of malicious signals is expected to be smaller in number than the set of benign signals, a portion of the set of benign signals may be selected at OPERATION 260 to cross join with the malicious signals to produce a new, larger set of malicious signals so that the two sets will contain a desired ratio of malign to benign signals. In various aspects, once the set of malicious signals and the set of benign signals are brought into a desired ratio (e.g., equilibrium), the two sets are used together as a training set.

At OPERATION 270 the training set of various attack scenarios made up of the balanced malicious and benign signals occurring in the rolling window 130 (and any historic signals 135) is made available for training predictive models. For example, the production models 120 used to analyze the security signals 115 are continually retrained and/or replaced with different predictive models as the contents of the rolling window 130 are updated over time to better evaluate the attacks and exploits actively being used against the online service 110. Method 200 therefore may conclude after OPERATION 270 or return to OPERATION 210 to continue gathering security signals 115 to periodically or constantly supply a training dataset based on a rolling window 130.

Figure 3:
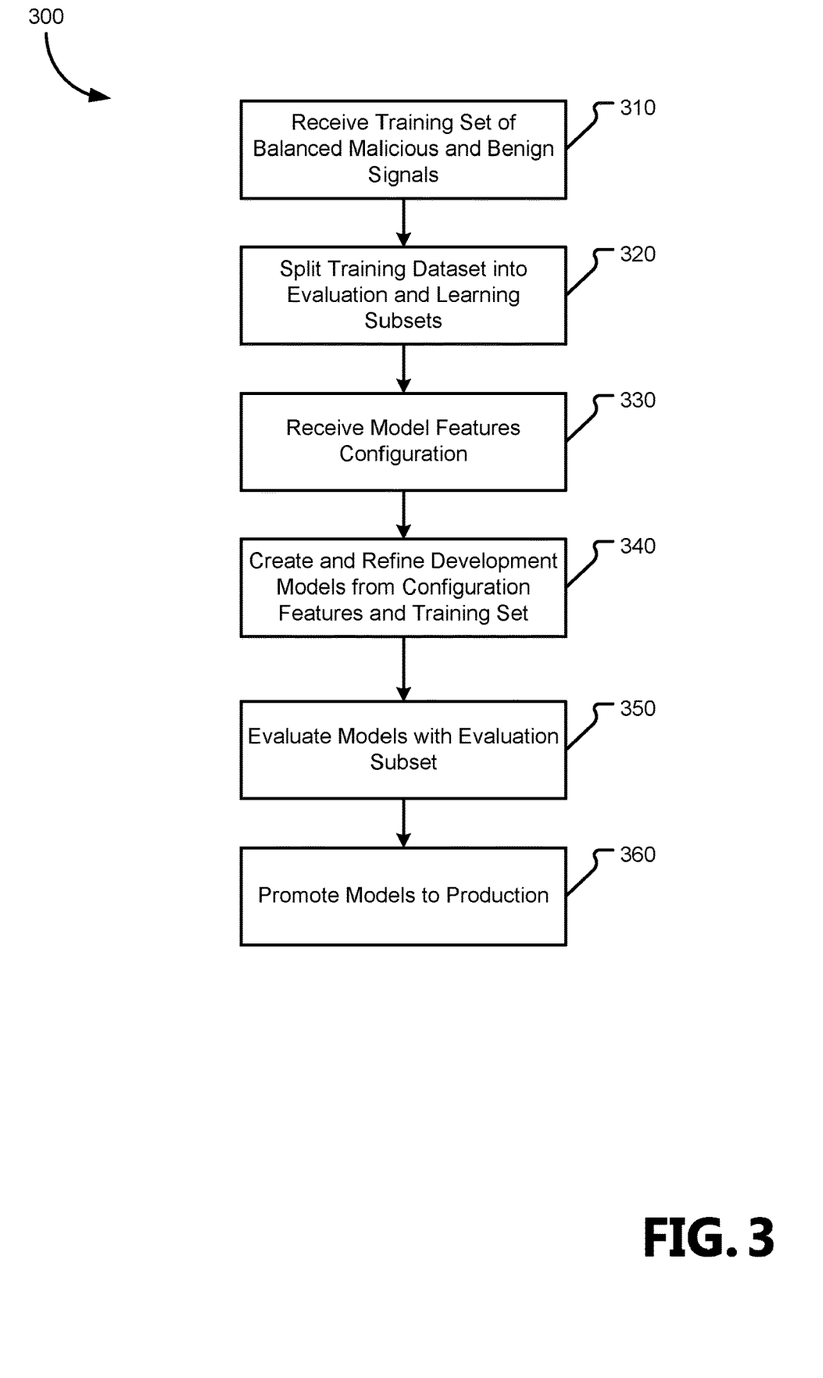
FIG. 3 is a flow chart showing general stages involved in an example method for training and selecting predictive models for use in securing an online service.

FIG. 3 is a flow chart showing general stages involved in an example method 300 for training and selecting predictive models for use in securing an online service 110. Method 300 begins with OPERATION 310, where a training dataset of balanced malicious and benign signals, such as that developed according to method 200, is received. In various aspects, method 300 is invoked on a periodic basis (e.g., every h hours), in response to an update to the rolling window 130 (and therefore the training dataset), or a user command.

Proceeding to OPERATION 320, the training dataset is split into an evaluation subset and a learning subset. In various aspects, the size of the evaluation subset relative to the training dataset may vary, but is generally smaller in size than the learning subset. For example, the evaluation subset may be one third of the initial training set, and the learning subset would therefore be the remaining two thirds of the initial training set. One of ordinary skill in the art will appreciate that other fractions of the training dataset may be split off for use as an evaluation subset.

At OPERATION 330 configuration features are received to produce development models 180 as potential predictive models for use in production (i.e., as production models 120) to secure an online service 110. An administrative user, such as a security analyst, chooses one or more parameters listed for in the online service 110 via the security signals 115 and a feature type by which to examine those parameters. The security signals 115 include, but are not limited to: event logs, network traces, error reports, special event listener reports, atomic detection, and combinations thereof, and the parameters for the selected features may include any of the elements included in the security signals 115.

For example, when the security signals 115 include network traces, a parameter of a sender/receiver address pair may be selected and evaluated according to a "count" feature type so that the number of times the pair is seen within the training set increments a score/value to evaluate for that feature. In another example, when the security signals 115 include network traces, a parameter of a number of bytes transmitted between a sender/receiver pair is provided as a value/score to evaluate for that feature. In a further example, a parameter of a balance of transmissions between a sender/receiver pair to indicate a relative upload/download ratio is provided as a value/score to evaluate for that feature. One of ordinary skill in the art will recognize the above as non-limiting examples; other parameters and other feature types of those parameters by which they may be evaluated by the predictive models are envisioned for use with the present application.

Proceeding to OPERATION 340 development models 180 are created based on the received features configuration and are refined in accord with the learning subset with one or more machine learning algorithms. Each predictive model is created to accept a specific feature vector (specifying the features selected by the administrative user) where each feature composing the feature vector is associated with a coefficient. Each feature vector is dynamically extracted from security signals 115 based on the features configuration. The values of the coefficients are adjusted over several epochs of a machine learning algorithm so that when a given development model 180 receives an input of a feature vector, the interactions between the various feature values may be adjusted to reliably produce an output of malicious or benign to match the outputs designated in the learning subset.

Proceeding to OPERATION 350, the predictive models refined in regard to the training dataset in OPERATION 340 are evaluated against the evaluation subset split from the training dataset in OPERATION 320. The evaluation subset includes inputs (the security signals 115 collected from the online service 110) with known outputs of whether the signal is malicious or benign. Additionally, the input/output pairs of the evaluation subset have not been used to directly train the development models 180 on, and thus provide a test as to whether the development models 180 provide a general functional rule for determining whether an unknown signal is malicious or benign.

A promotion threshold is applied to the development models 180 determine whether to promote a given development model 180 to a production model 120. The promotion thresholds specify how accurately a development model 180 needs to be in predicting whether signals are malicious or benign based on a feature vector extracted from the security signals 115. In some aspects, the promotion threshold is set as a constant, such as, for example, at least n% accuracy, a given area under a precision and recall curve on test data, etc. In other aspects the promotion threshold is set by the accuracy of a current production model 120 for a given feature vector or attack type so that for a development model 180 to replace a production model 120 in the security system 100, the development model 180 must be more accurate than the current production model 120.

At OPERATION 360 the development models 180 and reevaluated production models 120 that perform best according to the evaluation subset and promotion threshold are promoted for use by the security system 100 to safeguard the online service 110. Production models 120 that no longer satisfy the promotion threshold or have been superseded by development models 180 may be deleted or demoted to development models 180 for further training and correction, and for later reevaluation. Method 300 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
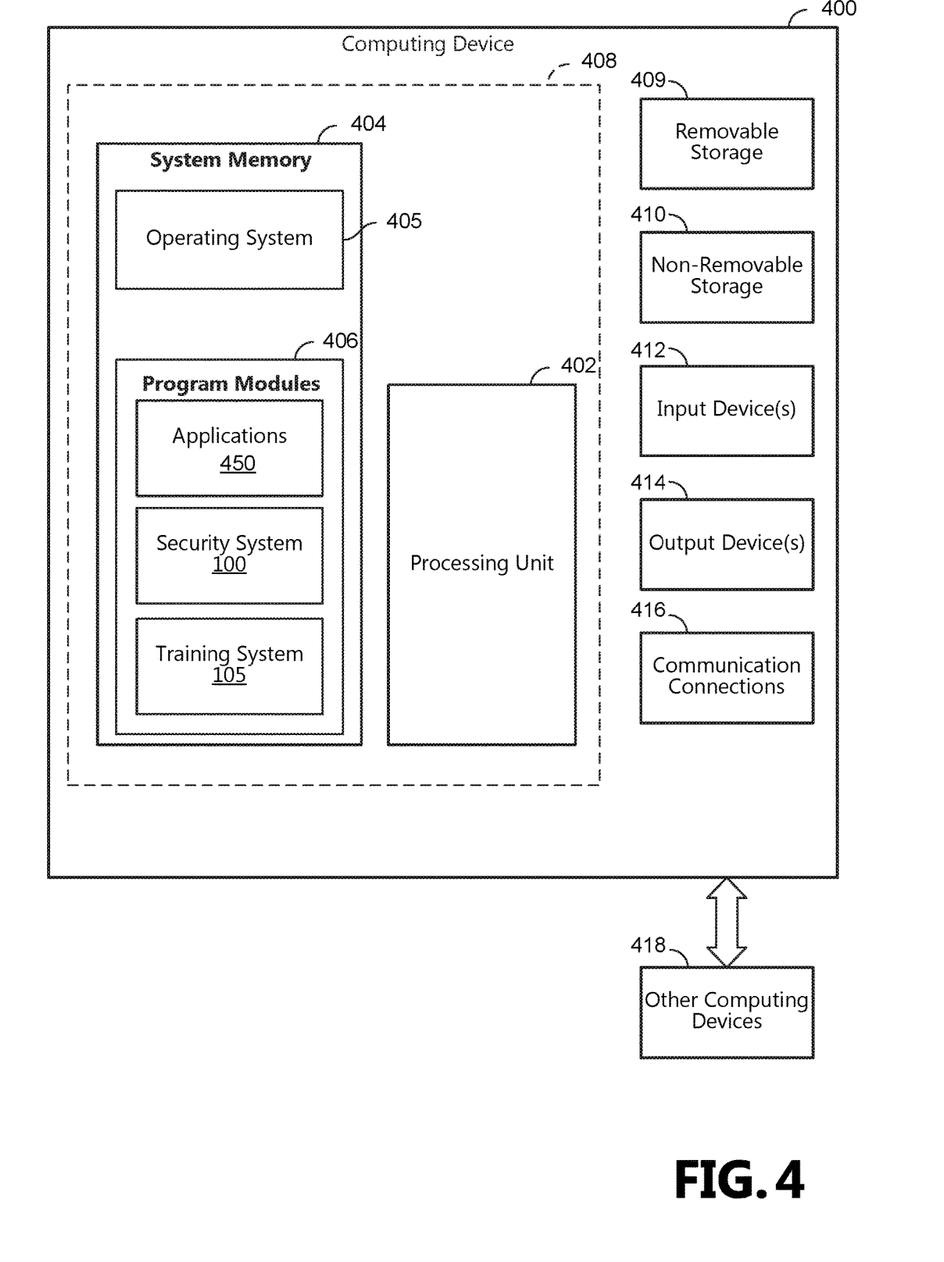
FIG. 4 is a block diagram illustrating example physical components of a computing device.

FIG. 4 and the associated description provide a discussion of a variety of operating environments in which examples are practiced. However, the devices and systems illustrated and discussed with respect to FIG. 4 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device 400, the system memory 404 is a memory storage device that comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the security system 100, the model training and selection system 105, and any models used or produced thereby. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., security system 100, model training and selection system 105) perform processes including, but not limited to, one or more of the stages of the methods 200 and 300 illustrated in FIGS. 2 and 3, respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for securing an online service provided over a network via a continuously learning model, the method comprising:
   gathering a set of security signals associated with one or more network sessions from the online service, wherein the set of security signals are gathered in a rolling window of time;
   identifying whether each security signal of the set of security signals is malicious or benign;
   producing a balanced training dataset for the rolling window of time by:
      balancing malicious signals of the set of security signals based on an attack type identified for each malicious signal,
      balancing benign signals of the set of security signals based on a device type from which each benign signal is received, and
      balancing the malicious signals with the benign signals by cross-joining the malicious signals with the benign signals;
   producing a predictive model based on the balanced training dataset, wherein in response to receiving an additional security signal associated with a new network session from the online service, the predictive model is applied to determine whether the additional security signal is malicious or benign.

2. The method of claim 1, wherein identifying whether each security signal of the set of security signals is malicious or benign further comprises:
   examining each security signal at a production model, wherein the production model is produced by a model trainer in accord with the balanced training dataset and configured to produce a detection result of whether a given security signal is malicious or benign;
   transmitting the detection result to an analyst user; and in response to receiving an action from the analyst user relative to the detection result, updating the detection result to indicate whether the given security signal is malicious or benign.

3. The method of claim 2, wherein an automated attacker simulates an attack on the online service, and wherein identifying whether each security signal of the set of security signals is malicious or benign further comprises:
receiving a notification from the automated attacker identifying security signals produced in response to the attack; and
treating the security signals produced in response to the attack as malicious regardless of the detection result.

4. The method of claim 2, wherein identifying whether each security signal of the set of security signals is malicious or benign further comprises:
extracting features from the given security signal;
determining whether the features extracted from the given security signal satisfy a feature set designated by an administrative user as defining an attack type;
in response to determining that the features extracted satisfy the feature set, designating the given security signal as malicious; and
in response to determining that the features extracted do not satisfy the feature set, designating the given security signal as benign.

5. The method of claim 4, wherein balancing the malicious signals of the set of security signals based on the attack type identified for each malicious signal further comprises:
balancing a relative number of attack types for a set of attack types observed for the malicious signals by at least one of:
increasing a relative quantity of underrepresented attack types in the set of attack types; and
decreasing a relative quantity of overrepresented attack types in the set of attack types.

6. The method of claim 4, wherein the feature set is identified in a structured document submitted by the administrative user, the structured document specifying feature types and data fields to observe in the set of security signals, and features of the feature set are dynamically extracted from the set of security signals based on the structured document without having to modify code.

7. The method of claim 1, wherein historic data signals are included in the set of security signals.

8. The method of claim 1, wherein balancing the benign signals of the set of security signals based on the device type from which each benign signal is received further comprises:
identifying a device in the online service from which at least one malicious signal was gathered within the rolling window; and
removing benign signals associated with the device from the set of security signals.

9. The method of claim 8, wherein balancing the malicious signals with the benign signals by cross-joining the malicious signals with the benign signals further comprises:
cross joining the malicious signals with the benign signals to produce a plurality of attack scenarios for the balanced training dataset, wherein the plurality of attack scenarios include the malicious signals and the benign signals.

10. The method of claim 1, wherein gathering the set of security signals in the rolling window further comprises:
identifying a timeframe in which to define the rolling window from a current time;
receiving, at the current time, new security signals from the online service;
adding the new security signals received at the current time to the set of security signals;
identifying existing security signals that have been added to the set of security signals outside of the timeframe from the current time; and
removing, from the set of security signals, the existing security signals that have been identified as having been added to the set of security signals outside of the timeframe from the current time.

11. A system for securing an online service provided over a network via a continuously learning model, the system comprising:
a processor; and
a memory storage device, including instructions that when executed by the processor are operable to:
receive security signals from devices within the online service, the security signals associated with one or more network sessions;
extract feature vectors from each of the security signals, wherein a given feature vector provides numeric values representing a status of a given device from which a given security signal is received;
produce detection results for each of the feature vectors via associated predictive models, wherein a given detection result identifies whether the given security signal associated with a given network session is indicative of malicious or benign activity on the given device;
define a rolling window, wherein the rolling window includes a plurality of security signals and associated detection results that have been received within a timeframe from a current time;
produce a balanced training dataset for the rolling window, wherein to produce the balanced training dataset the system is further configured to:
identify an attack type of each of the security signals in the rolling window identified as being indicative of malicious activity;
increase a quantity of security signals identified with underrepresented attack types in the rolling window relative to security signals identified with overrepresented attack types; and
cross join the security signals identified as being indicative of malicious activity with security signals identified as being indicative of benign activity to produce attack scenarios for the rolling window; and
update, according to a machine learning algorithm, the associated predictive models based on the balanced training dataset.

12. The system of claim 11, wherein updating the associated predictive models includes replacing production models, used to produce the detection results, with development models, developed from the balanced training dataset according to the machine learning algorithm, in response to the machine learning algorithm indicating that the development models more accurately identify whether the security signals are indicative of malicious or benign activity on the devices according to the balanced training dataset.

13. The system of claim 11, wherein historic signals are included in the rolling window, wherein the historic signals include security signals gathered outside of the timeframe.

14. The system of claim 11, wherein the security signals received from the devices within the online service include security signals generated in response to an automated attacker performing known malicious activities on the online service, and wherein the detection results produced for the security signals generated in response to the automated attacker performing the known malicious activities are set to indicate that the given security signal is indicative of malicious activity based on a notification from the automated attacker.

15. The system of claim 11, where to produce the balanced training dataset, the system is further configured to:
remove security signals identified as being indicative of benign activity from the rolling window in response to identifying that a particular device from which the security signals identified as being indicative of benign activity were received is associated with one or more security signals identified as being indicative of malicious activity in the rolling window.

16. The system of claim 11, where to produce the balanced training dataset, the system is further configured to:
identify a device type from which each of the security signals in the rolling window identified as being indicative of benign activity was received; and
increase a quantity of security signals identified with underrepresented device types in the rolling window relative to security signals identified with overrepresented device types.

17. A computer readable storage device including processor executable instructions for securing an online service provided over a network via a continuously learning model, the instructions comprising:
gathering a set of security signals associated with one or more network sessions from the online service, wherein the set of security signals are gathered in a rolling window of time;
examining each security signal of the set of security signals via predictive models to identify whether each security signal associated with a given network session is malicious or benign, wherein the predictive models are configured to produce detection results of whether a given security signal is malicious or benign based on a feature vector defined by an administrative user;
associating the set of security signals with the detection results to identify the set of security signals as malicious signals or benign signals;
balancing the malicious signals with the benign signals to produce a balanced training dataset, including:
identifying an attack type of each of the malicious signals;
identifying a device type from which each of the benign signals was gathered;
equalizing relative numbers of malicious signals in the rolling window based on identified attack types to produce a set of attack examples;
equalizing relative numbers of benign signals in the rolling window based on identified device types to produce a set of benign examples identified; and
cross joining the set of attack examples with at least a portion of the set of benign examples to balance a number of attack examples in the set of attack examples relative to a number of benign examples in the set of benign examples; and
refining the predictive models based on the balanced training dataset and a machine learning algorithm.

18. The computer readable storage device of claim 17, wherein balancing the malicious signals with the benign signals further comprises:
identifying a device in the online service from which at least one malicious signal was gathered within the rolling window; and
removing benign signals associated with the device from the set of security signals.

19. The computer readable storage device of claim 17, wherein examining each security signal via the predictive models further comprises:
transmitting the detection results to an analyst user; and
in response to receiving an action from the analyst user relative to the detection results, updating the detection results to indicate whether the given security signal is malicious or benign in light of the action from the analyst user.

20. The computer readable storage device of claim 17, wherein the feature vector includes a set of features of a status of the device that are identified in a structured document submitted by the administrative user to define a predictive model configured to identify one or more attack types, the structured document specifying feature types and data fields to observe in the set of security signals, and features of the set of features are dynamically extracted from the set of security signals based on the structured document without having to modify code.

* * * * *